UNITED STATES PATENT OFFICE.

EDWARD GOODRICH ACHESON, OF NIAGARA FALLS, ONTARIO, CANADA.

METHOD OF MAKING PURE UNCTUOUS GRAPHITE.

933,944.

Specification of Letters Patent. Patented Sept. 14, 1909.

No Drawing.

Application filed May 10, 1909. Serial No. 495,157.

*To all whom it may concern:*

Be it known that I, EDWARD GOODRICH ACHESON, a citizen of the United States, residing at Niagara Falls, Stamford township, Province of Ontario, Canada, have invented certain new and useful Improvements in Methods of Making Pure Unctuous Graphite, of which the following is a specification.

In my previous patents I have described and claimed processes of making graphite and graphite articles wherein a carbonaceous body, mass or article capable of transformation at high temperatures into graphite is electrically heated while protected from the oxidizing action of the air by a covering or envelop of granular or pervious material, which must be of relatively low electrical conductivity as compared with the carbonaceous mass, and refractory to the extent of remaining pervious to the gases at the highest temperature to which it is subjected. For such envelop I have heretofore employed a mixture containing sand and carbon, this mixture enveloping or covering the carbonaceous mass to be converted into graphite. The enveloping mixture has in practice been relatively shallow, the depth or thickness of the bed or layer being usually approximately one-fourth the diameter of the carbonaceous mass or core to be converted into graphite: furthermore, the sand and carbon composing the mixture have not been employed in practice in proper proportions for the formation of carbid of silicon, but in a proportion offering a higher resistance to the passage of the electric current. Under these conditions, and in the time required to completely graphitize the carbonaceous mass or core or the articles contained in or associated therewith, the enveloping mixture is partially converted into carbid of silicon, crystals of which are formed in a thin zone surrounding or partially surrounding the core. The conversion of the mixture into carbid of silicon is however quite incomplete under the conditions of graphitization, and the crystals are never bonded together into a firm, solid and coherent body, but on the contrary appear in the form of a friable and fragile mass, largely composed of very minute crystals, admixed with unconverted or partially converted material.

In order to recover the graphite from a furnace of this character it is necessary first to remove some portion of the envelop of sand and carbon, or of sand, carbon and carbid of silicon. It is impossible to effect this in practice without breaking the friable mass or detaching considerable quantities of the crystals. These detached portions, crystals or fragments contaminate the graphite or the outer portions thereof, and lead to considerable losses and great expense, particularly in the manufacture of the soft, unctuous and non-coalescing forms of graphite suitable for lubrication; for it will be evident that a mere trace of the extremely hard and highly abrasive carbid of silicon will completely destroy the value of the graphite as a lubricant. For this reason it is customary to carefully remove and reject the portion of the core adjacent the carbid zone, often amounting to 200 pounds or more in the charge of a single furnace, and to carefully separate the carbid of silicon and other foreign matters from the remaining graphite by concentration in a current of air.

I have now discovered that under proper conditions as hereinafter set forth it is possible to so operate the furnace as to obtain in the current path or interior zone of maximum temperature a pure, soft, unctuous and non-coalescing graphite, adapted for lubricating purposes, or such other grade of graphite or character of graphite article as may be desired, in accordance with the materials and arrangement of the core or carbonaceous resister and the time and intensity of heating, and around and enveloping this graphite a shell of carbid of silicon which is coherent, firm, self-supporting and non-friable in character to such degree that it may be broken up and removed to expose the graphite without seriously contaminating the latter or any portion of it, any detached crystals or crystalline aggregates being of such character as to be readily separated from the graphite. This is not only highly advantageous as regards the yield of graphite from the furnace and the purity of the product, but is also advantageous in that the carbid of silicon so formed is of such character as to be well adapted for abrasive purposes, consisting, more particularly in the portions adjacent the core, of large and well-defined crystals adapted for the manufacture of abrasive wheels. Thus, in addition to its primary functions of preventing combustion or oxidation of the graphite and retaining the heat in the furnace while permitting at all stages of the reaction a free escape of vapors or gases, it constitutes a valuable by-product of the graphite manufacture.

A further advantage of the process relates to the increased purity of the product due to the more complete volatilization of any contained ash or associated non-carbonaceous matters such as sand. As above pointed out, the product is purer because less subject to contamination from the enveloping material, but it is also inherently purer because the conditions of the process are such as to bring about the substantially complete elimination of non-carbon constituents. For example, it has been found practicable to produce a graphite containing from 99.90 to 99.95 per cent. of graphitic carbon, the residue representing, I believe, only such metallic or other condensable vapors as are present in the furnace at the close of the operation and are condensed on cooling upon the surfaces of the graphite therein. This purity is independent of the amount of ash or admixed material originally present in the graphite-forming charge, and I have been able to obtain a graphite of purity as above indicated from a charge whose content of non-carbonaceous matter varied from 0.2 per cent. or even less, to 40.0 per cent. or even more of the initial weight of the charge.

In order that the present invention may be clearly understood, it may be explained that the initial formation of carbid of silicon around a resistance body or core consists of minute crystals which are either separate or, if aggregated, exist as a loose and friable mass. On continued heating for a sufficient period the crystals adjacent the resister increase in size, acquire a plate-like form, and become firmly bonded or united into a solid and coherent shell. In order however that this result may be attained it is necessary not only to continue the heating for a much longer period than is requisite for the graphitization of the carbonaceous core, but to provide a much deeper or thicker bed or envelop consisting of or containing sand and carbon than is required for the protection of the core and the conservation of the heat when a mere graphitizing effect is sought. This necessity is a direct result of the longer heating period necessary for the production of the firm and coherent shell of carbid of silicon.

It would be quite impossible to obtain a firm or coherent shell of crystals of the character desired by longer heating under the heretofore obtaining conditions in the manufacture of graphite, for the reason that the comparatively thin bed of sand and carbon, even though in proper proportions to yield carbid of silicon, would permit too free escape of heat to render it practicable to maintain the desired temperature for the necessary time. A firm and coherent shell can, I believe, be obtained only by providing a much thicker bed or envelop consisting of or containing sand and carbon, in proper proportions for the production of carbid of silicon, and then heating the carbonaceous core, not only to complete graphitization, but for the much longer period necessary to produce adjacent this core and extending outwardly therefrom a thick mass or shell of carbid of silicon of which the inner surface is composed of relatively large and firmly aggregated crystals. To secure this effect the thickness of the bed or envelop should be at least one-half the diameter of the carbonaceous body to be converted into graphite, and is preferably considerably thicker than this; and the heating should be continued until the crust or layer of carbid of silicon has acquired a thickness corresponding to at least one-fourth the diameter of the core, and it is preferred to continue the heating until the crust of carbid of silicon is nearly or quite one-half the diameter of the core. Under these conditions only have I found it possible to establish and maintain a well-defined plane of demarcation between the finished products and to secure a clean separation of the carbid of silicon from the outermost layers of graphite.

I will describe the process by reference to the manufacture of a soft, unctuous and noncoalescing graphite suitable for lubricating purposes, it being understood however that the invention is not limited to the manufacture of graphite of this particular grade, or to the manufacture of bulk graphite as distinguished from that of graphite articles.

The furnace is provided with fixed terminals between which extend one or more starting cores consisting of rods or bars of carbon or graphite; usually such bars or rods are relatively short and a number of them are arranged in overlapping series or longitudinal contact to establish the easiest path. A single starting core may be employed, or two or more parallel cores may be used, these being surrounded by the carbonaceous material to be converted into graphite. Such carbonaceous material may comprise petroleum coke suitably subdivided, or anthracite coal or other suitable form of carbon, mixed if desired with a certain proportion of silica or other material capable of forming a carbid. This body of carbonaceous material extends between the terminals of the furnace, and is completely surrounded by a bed or envelop of sand and carbon in proper proportions for the formation of carbid of silicon, and so constructed as to be sufficiently porous to permit the free escape of the reaction gases. The thickness of this envelop of sand and carbon should bear a certain minimum proportion to the diameter of the body of carbon, and, as above pointed out, it is found desirable in practice that the thickness of the envelop should be in excess of one-half the diameter of the core. The current is now turned on the furnace and gradually brought to the full load required for the graphitization of the carbon, but instead of ceasing the passage of the current when the graphitization has been completed, or has proceeded to the extent of forming a commercial grade of graphite, the heating is continued, preferably but not necessarily at full load, until such time as the mixture of sand and carbon, or the portion thereof adjacent the graphite, is converted into a firm, coherent and non-friable mass or shell of carbid of silicon, whereof the constituent crystals are of such character that they not only aggregate into a firm or coherent mass and exhibit but little tendency to become detached and commingled with the graphite, but if so commingled are of such size and shape as to be capable of complete separation by jigging or like simple process of concentration. To obtain this result I have found it desirable to continue the heating for 30 to 36 hours or even longer, as distinguished from the 12 to 18 hours usually practiced for graphitization. It will thus be seen that the operation is distinguished from the manufacture of graphite as heretofore practiced in that,—(1) a deep or thick bed or envelop of a mixture adapted to yield carbid of silicon is provided around the carbon core or body to be converted into graphite, and (2) the heating is continued for a period in excess of that required for graphitization, until the non-carbonaceous matter associated with the carbon is volatilized with substantial completeness, and until the portion of the envelop adjacent the carbonaceous mass is converted into a firm and coherent crystalline aggregate of carbid of silicon.

The operation differs radically from that heretofore practiced in the manufacture of carbid of silicon in accordance with my prior patents, Nos. 492,767 and 560,291, in that the resistance core is composed of a material or charge adapted in its chemical character, physical division and arrangement to produce graphite of commercial grade and high purity, and the heat is applied under proper conditions to effect such conversion.

In case articles of carbon are to be graphitized these are usually embedded in a core material having a relatively low coefficient of electrical conductivity, the arrangement being preferably substantially as described in my prior patent No. 702,758, granted June 17, 1902.

From a purely technical or commercial point of view the present process is highly advantageous as compared either with the manufacture of graphite only or of carbid of silicon only. As compared with the manufacture of graphite it contemplates, it is true, a greater expenditure of power, but this is more than compensated by the increased purity of the graphite, the increased yield from the furnace, the saving of time and expense in purification, and by the recovery of merchantable carbid of silicon as a by-product of the operation. As compared with the manufacture of carbid of silicon as heretofore practiced, it is highly advantageous in that it yields in the zone of highest temperature a graphite of marketable grade, instead of a core material which is adapted for use only in a repetition of the process.

I claim:

1. The method of making pure, unctuous graphite which consists in electrically heating a body or mass of carbonaceous material capable of transformation into such graphite, confining the heat therein and protecting the same from oxidation by means of a permeable envelop completely surrounding the carbonaceous mass and containing sand and carbon in proper proportions to yield carbid of silicon, and continuing the heating until the carbonaceous material has been converted into an unctuous graphite of high purity, and a shell of carbid of silicon is formed surrounding the graphite, the portion of the shell adjacent the graphite being constituted of a firm, coherent and non-friable mass or aggregation of crystals of carbid of silicon, readily separable from the graphite, substantially as described.

2. The method of making pure, unctuous graphite which consists in electrically heating a body or mass of carbonaceous material capable of transformation into such graphite, confining the heat therein and protecting the same from oxidation by means of a permeable envelop completely surrounding the carbonaceous mass and containing sand and carbon in proper proportions to yield carbid of silicon, said envelop having a thickness corresponding to at least one-half the diameter of the carbonaceous material, and continuing the heating until the carbonaceous material has been converted into an unctuous graphite of high purity and a shell of carbid of silicon is formed extending outwardly from the carbonaceous body to at least one-fourth the diameter of said body, the portion of the envelop adjacent the graphite being constituted of a firm, coherent and non-friable mass or aggregation of crystals of carbid of silicon, readily separable from the graphite, substantially as described.

In testimony whereof, I affix my signature in presence of two witnesses.

EDWARD GOODRICH ACHESON.

Witnesses:
 FRANK N. COE,
 GEORGE SHIPSTON.

Correction in Letters Patent No. 933,944.

It is hereby certified that in Letters Patent No. 933,944, granted September 14, 1909, upon the application of Edward Goodrich Acheson, of Niagara Falls, Ontario, Canada, for an improvement in "Methods of Making Pure Unctuous Graphite," an error appears in the printed specification requiring correction as follows: Page 2, line 125, the word "constructed" should read *constituted;* and that the said Letters Patent should be read with this correction therein that the same may conform to the record of the case in the Patent Office.

Signed and sealed this 7th day of December, A. D., 1909.

[SEAL.]

E. B. MOORE.

*Commissioner of Patents.*